United States Patent
Matsui et al.

(10) Patent No.: US 8,877,660 B2
(45) Date of Patent: Nov. 4, 2014

(54) BASE FABRIC FOR AIR BAG

(75) Inventors: Yoshihiro Matsui, Otsu (JP); Mamoru Kitamura, Otsu (JP)

(73) Assignee: Toyobo Co., Ltd., Osaka (JP)

( * ) Notice: Subject to any disclaimer, the term of this patent is extended or adjusted under 35 U.S.C. 154(b) by 28 days.

(21) Appl. No.: 13/979,435

(22) PCT Filed: Jan. 12, 2012

(86) PCT No.: PCT/JP2012/050440
§ 371 (c)(1),
(2), (4) Date: Jul. 12, 2013

(87) PCT Pub. No.: WO2012/098976
PCT Pub. Date: Jul. 26, 2012

(65) Prior Publication Data
US 2013/0295810 A1    Nov. 7, 2013

(30) Foreign Application Priority Data

Jan. 21, 2011 (JP) .................. 2011-010478

(51) Int. Cl.
| | | |
|---|---|---|
| *D06M 15/59* | (2006.01) | |
| *D03D 1/02* | (2006.01) | |
| *B60R 21/235* | (2006.01) | |
| *D06N 3/00* | (2006.01) | |
| *D06N 3/12* | (2006.01) | |

(52) U.S. Cl.
CPC ............... *D03D 1/02* (2013.01); *B60R 21/235* (2013.01); *D06M 15/59* (2013.01); *D06N 3/0065* (2013.01); *D06N 3/125* (2013.01); *B60R 2021/23514* (2013.01); *D06N 2211/268* (2013.01)

USPC ..... 442/158; 428/34.1; 280/728.1; 427/393.5

(58) Field of Classification Search
CPC ................... B60R 2021/23514; B60R 21/235; D03D 1/02; D06M 15/59; D06M 15/263
USPC ......... 280/728.1; 442/76, 130, 158, 286, 304; 428/34.1, 34.5, 34.6, 35.7, 36.1, 412, 428/480, 523, 474.4, 474.5, 421, 704
See application file for complete search history.

(56) References Cited

U.S. PATENT DOCUMENTS

| | | | |
|---|---|---|---|
| 3,491,067 A * | 1/1970 | Sellet | 525/440.08 |
| 5,208,821 A | 5/1993 | Berger et al. | |
| 6,444,596 B1 | 9/2002 | Hirai et al. | |
| 2006/0217016 A1* | 9/2006 | Lin et al. | 442/59 |

FOREIGN PATENT DOCUMENTS

| | | |
|---|---|---|
| JP | 08-085405 | 4/1996 |
| JP | 2000-212877 | 8/2000 |
| JP | 2001-287609 | 10/2001 |
| JP | 2001-329468 | 11/2001 |
| JP | 2002-327350 | 11/2002 |
| JP | 2003-183983 | 7/2003 |

OTHER PUBLICATIONS

Japanese Patent Office, International Search Report for International Patent Application PCT/JP2012/050440 (Jul. 31, 2012).

* cited by examiner

*Primary Examiner* — Arti Singh-Pandey
(74) *Attorney, Agent, or Firm* — Fish & Richardson P.C.

(57) ABSTRACT

A base fabric for an air bag obtained by applying a reactive compound, a water-dispersed resin composition and a water-dispersible pigment to a woven/knitted fabric made of synthetic fiber and then subjecting the resulted coated fabric to a thermal treatment.

7 Claims, No Drawings

BASE FABRIC FOR AIR BAG

TECHNICAL FIELD OF THE INVENTION

The present invention relates to a base fabric for an air bag wherein a pigment being dispersed in water using a surfactant and a water-dispersible resin are applied to a woven/knitted fabric, and wherein color shading upon processing and color change by wetting with water after drying (which are apt to happen under a state of little applying amount of the resin) are now hardly noted.

BACKGROUND ART

An air bag has been quickly increasing in its installing rate in recent years as one of the safety parts for cars. The air bag is used for such a purpose that, in car collisions, a sensor perceives the shock, gas of high temperature and high pressure is generated from an inflator and the airbag is quickly developed by the gas whereby the collision of the bodies or, particularly, the heads of a driver and a passenger to steering wheel, windshield, door glass, etc. is prevented and protected. Until now, a coating woven fabric coated with synthetic rubber such as chloroprene, chlorosulfonated olefin or silicone has been used for an air bag because its heat resistance, gas blocking property (low air permeability) and flame retardancy are high. It has been also conducted to add a coloring agent to a resin composition for checking whether a coating agent is used, whether uneven application of coating agent exists, etc.

The resin including the synthetic rubber as mentioned above has been used as a coating agent after making into a solution using an organic solvent. In this regard, there is a problem that the organic solvent is vaporized so that the environment of particularly the working place is polluted. Thus, at present, use of the silicone of a solvent-free type is a mainstream. In the silicone of a solvent-free type, however, the rate of solid in a coating agent is 100% whereby there is a limitation for making the coating amount small and it has been technically difficult to apply at the rate of not more than 10 g/m$^2$. Since the adhered amount of the resin is too much, there has been a problem for achieving an object of making an airbag light in weight and compact in size which has been demanded in recent years.

As a means for making the coating amount small without using organic solvent, a method of conducting an impregnation treatment using a water-dispersible resin has been known (e.g. see Patent Documents 1 and 2). When a resin dispersed in water as such is applied to a woven/knitted fabric, etc., a water-dispersible pigment is usually used taking the dispersibility in a solution into consideration although that is not mentioned in the Patent Documents. In this regard, there has been a problem that, when the adhered amount of the water-dispersible resin is reduced, unevenness of the water-dispersible pigment is apt to become visible. There is still another problem that, when water freshly adheres to the dry fabric, the pigment is dispersed in the water once again whereby color shading happens.

When the adhered amount of the resin is made as small as possible or, to be more specific, when it is made 8 g/cm$^2$ or less, color shading is apt to become visible since the resin existing on the surface of base fabric becomes small. In addition, when water is present in the base fabric after drying, the pigment is apt to move and, even if it moves only a little, the color shading is prominent. As such, it has been difficult to suppress the color shading together with making the adhered amount of the resin dispersed in water small.

Patent Document 3 discloses a technique where, when a solid powder which is dispersed in water in the presence of a surfactant is used as an aqueous emulsion of silicone, the adding amount of solid powder is made within a range of 0.1 part by mass to less than 5 parts by mass. However, adhered amount of the aqueous silicone emulsion is 8 g/m$^2$ or more and, moreover, the aqueous silicone emulsion is not self-extinguishable when its applying amount is made small whereby there is a problem that an flammability test (JIS D 1201; horizontal method) demanded for airbags for automobiles cannot be cleared. There is no disclosure therein for a technique concerning a coated fabric in which the burning rate is 80 mm/min or less or, particularly, which is self-extinguishable and in which color shading hardly happens upon adhesion of water in spite of low applying amount.

As mentioned hereinabove, when an adhered amount of a water-dispersible resin is made small, color shading is apt to becomes visible and, particularly in the case of a non-cross-linked resin suitable for recycling, the resin is sometimes re-dispersed by water even after heat-dried.

PRIOR ART DOCUMENTS

Patent Documents

Patent Document 1: Japanese Patent Application Laid-Open (JP-A) No. 2002-327350
Patent Document 2: Japanese Patent Application Laid-Open (JP-A) No. 2003-183983
Patent Document 3: Japanese Patent Application Laid-Open (JP-A) No. 2001-287609

DISCLOSURE OF THE INVENTION

Problem that the Invention is to Solve

An object of the present invention is to solve the conventional problems and difficulties as mentioned above and is to provide a base fabric for an air bag where air permeability is low and color shading hardly happens even when a water-dispersible resin containing a pigment being dispersed in water is applied to a woven/knitted fabric.

Means for Solving the Problem

The base fabric for an air bag according to the present invention which can solve the above problems comprises the following constitutions:

(1) A method for manufacturing a base fabric for an air bag, characterized in that, an aqueous resin composition containing a pigment, a reactive compound and a water-dispersible thermoplastic resin is applied to a woven/knitted fabric made of synthetic fiber and then subjected to a thermal treatment.

(2) The method for manufacturing a base fabric for an air bag according to the above (1), wherein the pigment is dispersed in water using a surfactant and the water-dispersed liquid contains the reactive compound which reacts with the surfactant.

(3) The method for manufacturing a base fabric for an air bag according to any of the above (1) and (2), wherein the surfactant contains a hydroxyl group, the reactive compound has a reactive group which reacts with the hydroxyl group and the number-average functional group number of the reactive group is 2 or more.

(4) The method for manufacturing a base fabric for an air bag according to any of the above (1) to (3), wherein the surfactant is a nonionic surfactant.

(5) A base fabric for an air bag, characterized in that, a resin composition containing a pigment and a thermoplastic resin is applied to a woven/knitted fabric made of synthetic fiber in an amount of 0.1 to 8.0 g/m² and color change rate before and after application of water drops calculated by the following formula (1) is 10% or less:

Color change rate=$(|L^*$ value after the application$-L^*$ value before the application$|^2+|a^*$ value after the application$-a^*$ value before the application$|^2+|b^*$ value after the application$-b^*$ value before the application$|^2)^{1/2}/[(L^*$ value before the application$)^2+(a^*$ value before the application$)^2+(b^*$ value before the application$)^2]^{1/2}\times 100$   Formula (1)

(6) The base fabric for an air bag according to (5), wherein the burning rate by a flammability test measured by JIS D 1201 (Horizontal method) is 80 mm/min or less.

Advantages of the Invention

The base fabric for an air bag according to the present invention has been achieved by paying attention to the chemical structure of a "surfactant" used for dispersing the pigment in water. To be more specific, attention has been paid to a functional group in the surfactant contributing to water-dispersibility or, in other words, to a moiety having polarity in the surfactant and, particularly, to a hydroxyl group in the surfactant. When this "functional group contributing to water-dispersibility" is made to react with a reactive compound, it is now possible to suppress the movement of a pigment during drying and, at the same time, to reduce the color shading caused by water drops after drying. Therefore, even when the adhered amount of the resin is reduced, it is now possible to provide a base fabric for an air bag where color change after drying caused by wetting with water hardly happens.

BEST MODE FOR CARRYING OUT THE INVENTION

The present invention will now be illustrated in detail as hereunder.

Material of the synthetic fiber used in the present invention are not particularly limited. Examples thereof are aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate. Besides the above, all-aromatic polyester fiber, ultra-high-molecular-weight polyethylene fiber, poly-p-phenylenebenzobisoxazole fiber (PBO fiber), polyphenylene sulfide fiber, polyether ketone fiber, etc. can be used. However, when economy is taken into consideration, the polyester fiber and the polyamide fiber are especially preferred. In those fibers, a part of or all of them may be prepared from the recycled raw materials. In the synthetic fibers as such, various kinds of additives may be contained therein for a purpose of enhancing the step passing property in the manufacturing step for starting yarn or the after-processing step. Examples of the additive used therefor include antioxidant, thermostabilizer, flattening/smoothening agent, antistatic agent, thickener and flame retardant. Further, the synthetic fiber may be a dope-dyed yarn or a yarn which is dyed after filature. Furthermore, the cross section of the single yarn of the synthetic fiber may be not only the ordinary round cross section but also the differently shaped cross section. It is preferred in view of strength at breakage and elongation at breakage that the synthetic fiber is used and woven as a multifilament thread.

In the synthetic fibers as such, various kinds of additives may be contained therein for a purpose of enhancing the step passing property in the manufacturing step for starting yarn or the after-processing step. Examples of the additive used therefor include antioxidant, thermostabilizer, flattening/smoothening agent, antistatic agent, thickener and flame retardant. Further, the synthetic fiber may be a dope-dyed yarn or a yarn which is dyed after filature. Furthermore, the cross section of the single yarn of the synthetic fiber may be not only the ordinary round cross section but also the differently shaped cross section. It is preferred in view of strength at breakage and elongation at breakage that the synthetic fiber is made into a multifilament thread and used as warp and weft, and a fabric is woven therefrom.

Although the fabric used in the present invention may be any of a woven fabric and a knitted fabric, it is preferred to use a woven fabric in view of achievement of low air permeability and mechanical properties such as strength/elongation of a fabric. Although there is no particular limitation for a weaving method for a woven fabric, plain weave is recommended when the uniformity of the woven fabric property is taken into consideration. With regard to the thread used, its warp and weft may not be single and there is no problem at all even when, for example, size, yarn numbers, fiber type, etc. are different.

The base fabric for an air bag according to the present invention is manufactured by such a manner that a resin mixture which has been dispersed into water by a known method is applied to a fabric prepared by a known method. Although there is no particular limitation for method of application, a method where the coating is conducted on one side of the fabric is preferred for achieving low air permeability with a small applying amount. Although there is no particular limitation for a coating method but known methods may be used, it is preferred to use a knife coating method when the cost and the softness/flexibility of woven fabric after application are taken into consideration.

As to the resin composition dispersed in water according to the present invention, there may be used polyurethane resin, acrylic resin, polyester resin and polyamide resin. The resin dispersed in water mentioned hereinabove may be not only a resin which is soluble in water but also a resin which is dispersed in a state of colloid or emulsion and there is no particular limitation therefor.

It is preferred in view of air permeability that the resin composition dispersed in water is an elastomer resin. Further, for a purpose of achieving the elastomer property together with being dispersed in water, it is preferred that the resin contains ether bond.

As to the resin composition dispersed in water used, thermoplastic resin is preferred. A base fabric for an air bag needs to pass the evaluation under the flammability test (FMVSS 302 method) demanded for the automobile use. When the adhered amount of the resin applied to the base fabric is reduced, burning rate tends to become quick with silicone resin (thermoset resin). When the adhered amount of the resin applied to the base fabric is large, burning property of the resin determines the burning rate of the base fabric for an air bag. When the adhered amount of the resin is reduced, the burning rate is determined in view of the relation between the behavior of the resin and the behavior of the base fabric upon the flammability test. Thus, when silicone resin which is a thermoset resin is used, behavior upon the flammability test is different between the resin and the base fabric, which results in a phenomenon of continuous maintenance of the source for making a fire since the fiber constituting the base fabric such as Nylon 6.6 is a thermoplastic resin. As a result, burning rate is thought to become quick. When a thermoplastic resin is used for a resin composition, similar behavior is shown upon burning between the resin and the fiber (made of thermoplastic resin) constituting the base fabric whereby the self-extinguishing property is apt to be easily achieved. Incidentally, the thermoplastic resin mentioned in the present invention means a resin where the endothermic peak upon melting is observed in a DSC measurement.

There is no particular limitation for the reactive compound mixed in a resin mixture dispersed in water to be applied to a base fabric according to the present invention provided that the reactive compound reacts with a functional group having polarity contained in a dispersing agent which disperses the pigment. Most of the pigment dispersed in water by the dispersing agent is that which is dispersed by a nonionic surfactant and, with regard to a functional group used for the surfactant, a hydroxyl group may be exemplified. It is likely that, in a base fabric applied with a pigment dispersed in water using a surfactant, the nonionic surfactant still remains around the pigment even after dried by heat. The present invention has been achieved by paying the attention to the presumed mechanism as shown below:

(1) In a drying step, since it is possible that the pigment and the surfactant move until completely dried, there will be a possibility that color shading happens during the step. "The surfactant which disperses the pigment" is made react with a reactive compound and fixed upon drying so that the movement of the pigment is suppressed.

(2) When water is adhered to the fabric after drying, the surfactant existing around the pigment achieves affinity with water and, as a result of abrasion and permeation, the phenomenon of movement of the pigment is resulted. As a result of the reaction of the reactive compound with the surfactant for fixation, the movement of the pigment is suppressed.

In view of the reaction efficiency, number of "functional group having polarity" in one molecule of the reactive compound is preferred to be 2 or more in terms of number-average functional group number. More preferably, the number is 2.4 or more and, still more preferably, 3.0 or more. However, when the number-average functional group number is too many, texture of the base fabric itself for an air bag become hard whereby it is preferred to be not more than 10.

In the present invention, there is no particular limitation for the reactive compound so far as it reacts with "a functional group having polarity". However, when the reaction with hydroxyl group abundantly used in nonionic surfactant is taken into consideration, it is preferred in view of the reactivity at low temperature and also of the cost that the reactive compound has an isocyanate group as a functional group. Mixing amount of the reactive compound having an isocyanate group to 100 parts by mass of a coating agent in terms of solid is preferred to be 1 to 40 part(s) by mass. When it is less than 1 part by mass, a fixing effect for the surfactant is little and the effect for suppressing the color shading is reduced. When it is more than 40 parts by mass, foaming is apt to happen upon making into a mixed solution. More preferably, it is 2 to 30 parts by mass and, still more preferably, 3 to 20 parts by mass. Since it is thought that the isocyanate group generates carbon dioxide by reacting with water, it is preferred that no reaction catalyst is mixed therewith or, even if added, the amount of the reaction catalyst to the reactive solid is made not more than 0.5% in terms of ratio by weight.

It is necessary in the present invention that the resin mixture dispersed in water to be applied to a base fabric contains a pigment. Since pigment has better coloring property even in small amount as compared with other coloring agent such as dye, its adding amount can be made small. When the adding amount of the pigment is too much, strength of the resin film formed by the resin mixture dispersed in water is apt to become low. Thus, it is preferred that the adding amount of the pigment is as small as possible. Color of the pigment may be any of the types of red, orange, blue, green, yellow, black, gray, etc. and there is no particular limitation therefor and it is also possible to use by mixing them. The pigment may be any of inorganic and organic ones and, in view of the dispersibility, an organic pigment is preferred. Examples of the usable organic pigment include condensed azo type, isoindolinone type, phthalocyanine type, threne type, benzimidazolone type, quinacridone type, halogenated copper phthalocyanine type and copper phthalocyanine ($\beta$) type. The amount of the pigment to be contained therein may be adjusted depending upon the desired hue but, when the pigment component is too small, front side and back side are apt to be hardly judged while, when it is too much, film strength of the resin becomes weak and air permeability is apt to become high. Adding amount of the pigment to 100 parts by mass (calculated as a solid) of the resin composition dispersed in water is preferred to be 0.001 to 5.0 part(s) by mass, more preferred to be 0.05 to 3.0 part(s) by mass, and particularly preferred to be 0.01 to 1.0 part by mass. With regard to the pigment used for the resin mixture dispersed in water, that which can be dispersed in water is preferred.

It is preferred that a resin mixture dispersed in water is applied in an amount of 0.1 to 8.0 $g/m^2$ (in terms of the mass after being dried) to the base fabric of the present invention. When the resin mixture is less than 0.1 $g/m^2$, the rate of filling the gaps among the fibers becomes small and air permeability becomes high. When it is more than 8.0 $g/m^2$, texture is apt to become hard. More preferably, it is 2 to 7 $g/m^2$ and, still more preferably, 3 to 6 $g/m^2$.

The mass after drying is determined by deducting the value of the mass of the woven/knitted fabric before application of the water-dispersed resin mixture as measured in accordance with JIS L 1096 8.4.2 from the value of the mass of the woven/knitted fabric after the application followed by drying as measured in accordance with JIS L 1096 8.4.2. Incidentally, the woven/knitted fabric before the application in the present invention means a woven fabric which finishes the steps except the application of the water-dispersed resin mixture during the stage immediately before application of the water-dispersed resin mixture and, usually, the woven fabric has already been subjected to shrinking process and thermal setting by means of thermal treatment. It is possible that only woven/knitted fabric is dissolved out using a specific solvent and the calculation is done from the weight of the residual applied thing. It is also possible that only the applied thing is dissolved out and the calculation is done from the weight of the residual woven/knitted fabric. It is further possible to determine the mass of the woven fabric before applying the resin presumed from the fineness, weaving density, etc. of the starting yarn constituting the woven fabric.

In the base fabric of the present invention, its initial air permeability under the pressure difference of 100 kPa is preferred to be 0.001 to 1.00 $L/cm^2/min$. When the air permeability is less tan 0.001 $L/cm^2/min$, the water-dispersed resin mixture needs to be applied in much amount and the texture is also apt to become hard. When the air permeability is more than 1.00 $L/cm^2/min$, degree of freedom in designing the air bag becomes low and it is difficult to satisfy the property as a curtain air bag. More preferably, it is 0.002 to 0.5 $L/cm^2/min$, and particularly preferably 0.003 to 0.03 $L/cm^2/min$.

In the present invention, air permeability under the pressure difference of 100 kPa is used for evaluating the air permeability of the base fabric. This is because, in the usual develop of air bag, the force of 30 to 50 kPa is applied but, due to the influence of heat by the explosive of an inflator, it is suitable to evaluate the air permeability under the pressure difference of 100 kPa.

When a coating agent of organic solvent type or solvent-free type being out of the scope of the present invention is used, the pigment used therefor is often non-hydrophilic or the resin mixture itself is not hydrophilic whereby, even if water is applied, the possibility of color change is low. In general, however, a water-dispersed pigment is used when a water-dispersed resin composition is applied to a woven/knitted fabric whereby, in case water adheres to the woven/knitted fabric to which the resin is applied, re-dispersion into water happens and color shading is apt to happen. In the present invention, however, since a reactive compound which suppresses the re-dispersion of the pigment is added in the water-dispersed resin mixture, color shading hardly happens.

The base fabric for an air bag of the present invention is preferably characterized in that, regarding hue before and after application of water drops, color change rate before and after application of water drops calculated by the following formula (1) is 10% or less:

Color change rate=$(|L^*$ value after the application$-L^*$ value before the application$|^2+|a^*$ value after the application$-a^*$ value before the application$|^2+|b^*$ value after the application$-b^*$ value before the application$|^2)^{1/2}/[(L^*$ value before the application$)^2+(a^*$ value before the application$)^2+(b^*$ value before the application$)^2]^{1/2} \times 100$  Formula (1)

The color change rate is preferably 8% or less and more preferably 5% or less.

There is no particular limitation for the coating method of the present invention but known methods may be used therefor. In order to make the applied amount small, a knife coating method is particularly preferred. Although a thickener may be used in order to achieve the viscosity meeting for a coating method, it is preferred that the water-dispersed resin mixture applied to the base fabric of the present invention does not contain a thickener having high hydrophilicity such as carboxymethyl cellulose. When a coated fabric to which a resin mixture containing a hydrophilic thickener is applied contacts water, the hydrophilic thickener is apt to contain water therein and there is a tendency of resulting in loss of color. The color loss can be suppressed to some extent by increasing the reactive compound but, when the reactive compound is too much, the outcome is not favorable since the coating liquid is apt to be foamed and the coating becomes difficult and, even if the coating is possible, uniform application is difficult. As a method for conducting the viscosity adjustment for the present invention, it is preferred that the concentration of the aqueous dispersion of the thermoplastic resin is made high.

As to a method for manufacturing a base fabric for an air bag according to the present invention, it is preferred that a water-dispersible pigment and a reactive compound are mixed with a water-dispersed resin composition and the mixture is applied to a woven/knitted fabric made of synthetic fiber and subjected to a thermal treatment. It is preferred that the reactive compound is not mixed with a water-dispersed resin composition until immediately before applying the resin to the base fabric because of the fact that the reaction out of the object hardly takes place thereby and the aimed reaction of the reactive compound with the surfactant proceeds thereby. In order to enhance the aimed reaction of the reactive compound with a functional group such as a hydroxyl group contained in the surfactant which disperses a pigment, it is preferred that a thermal treatment is carried out after an water-dispersed resin mixture is applied to the woven/knitted fabric made of synthetic fiber.

In a flammability test, the burning rate of the base fabric for an air bag according to the present invention is preferred to be 80 mm/min or less, more preferred to be 40 mm/min or less and, still more preferably, it is self-extinguishable. Generally, in the coated fabric of a cross-linking type such as silicone, no self-extinguishing property is achieved unless the applied amount of silicone is 25 g/m$^2$ or more and, when the applied amount is less than that, self-extinguishing property is hardly resulted. Particularly when the amount is less than 10 g/m$^2$, self-extinguishing property is hardly achieved. Since the water-dispersible resin used in the base fabric for an air bag according to the present invention is thermoplastic, there is a tendency of showing the self-extinguishing property in a flammability test.

In the woven/knitted fabric made of synthetic fiber which constitutes the base fabric for an air bag according to the present invention, a cover factor (CF) represented by the formula (2) is preferred to be 1,800 to 2,500. When it is less than 1,800, it is difficult to achieve low air permeability in a small applying amount. When it is more than 2,500, the outcome is that not only the operability on the weaving machine upon preparing the woven fabric is apt to become bad but also softness/flexibility of the woven fabric becomes poor. Cover factor is preferably 2,000 to 2,450 and more preferably 2,050 to 2,400.

CF={Density of warp((yarn numbers)/2.54 cm)×√(Density of warp(dtex)×0.9)}+{Density of weft ((yarn numbers)/2.54 cm)×√(Density of weft (dtex)×0.9)}  Formula (2)

EXAMPLES

As hereunder, the present invention will be specifically illustrated by way of Examples. Incidentally, various evaluations in the Examples were done according to the following methods.

(1) $L^*$ value, $a^*$ value and $b^*$ value

A spectrometer CM 3700d manufactured by Minolta was used with the light source of D65 and with visible field of 10°. Mean value of n=3 was adopted.

Method for applying the water drops is as follows: a towel was placed beneath a base fabric, the area to which the resin was adhered was made upside, water of about 3 cc was dropped on the base fabric and water drops were made to exist in nearly a circular shape having diameter of about 2 cm. It was allowed to stand at room temperature for 24 hours after applying the water drops to dry. The resulting area in a nearly circular shape was measured as the side applied with the water drops.

(2) Air permeability

Air permeability under the pressure difference of 100 kPa was measured using a high-pressure air permeability measuring apparatus (manufactured by OEM Systems). Measurement was done in five random places and the mean value thereof was determined.

(3) Applied amount

Applied amount was measured by deducting the weight of a woven/knitted fabric used as a base from the weight of a woven/knitted fabric to which the resin was applied. Method for measuring the weight was in accordance with JIS L 1096.

(4) Flammability

Flammability was measured according to a method mentioned in JIS D 1201 (Horizontal method). The resin-applied area was made downside and ignited, measurements were conducted for five times and the highest burning rate (mm/min) was adopted as the flammability. The case where the burning distances did not reach the mark line of 38 mm was judged to be self-extinguishable.

Example 1

Polyamide 66 yarn comprising 108 filaments and having the total fineness of 400 dtex was woven by plain weave in a water jet loom, then subjected to a shrinkage processing using boiling water and subjected to a dry finishing at 110° C. to give a woven fabric having the warp density of 58 yarn numbers/2.54 cm and the weft density of 56 yarn numbers/2.54 cm. A thermoplastic polymer (Mw: 90,000) being polymerized together with an antioxidant (Irganox 1010 manufactured by CIBA Japan) in an amount of 0.8% by mass in terms of a polymer ratio to make the ratio by mole among polyamide 6, an adduct of polyethylene glycol to propylamine (number-average molecular weight: 600) and adipic acid 2.5:1:1 was used to prepare an aqueous resin dispersion (pH 7.2) having solid concentration of 25% by mass. After that, 0.4 g of Phthalocyanine Green pigment (DY-4 manufactured by Mikuni Shikiso; solid concentration: 25% by mass) was added to 100 g of the aqueous resin dispersion. Then 2.5 g of Aquanate 210 (polyisocyanate) manufactured by Nippon Polyurethane was added thereto followed by stirring. The resulting aqueous dispersion of the resin mixture was applied onto one side of the above woven fabric by means of a knife coating method and the resin amount after drying was made 4.1 g/m$^2$. Characteristic of this coated fabric was evaluated and the result is shown in Table 1.

Example 2

Polyamide 66 yarn comprising 144 filaments and having the total fineness of 350 dtex was woven by plain weave is a water jet loom, then subjected to a shrinkage processing using boiling water and subjected to a dry finishing at 110° C. to give a woven fabric having the warp density of 58 yarn numbers/2.54 cm and the weft density of 57 yarn numbers/2.54 cm. An antioxidant (Irganox 1010 manufactured by CIBA Japan) in an amount of 1.4% by mass in terms of a polymer ratio and a thermoplastic polymer (Mw: 150,000) being polymerized to make the ratio by mole among polyamide 6, an adduct of polyethylene glycol to propylamine (number-average molecular weigh: 900) and adipic acid 2.1:1:1 were used to prepare an aqueous resin dispersion (pH 7.1) having solid concentration of 5% by mass. After that, 1.2 g of Phthalocyanine blue pigment (DY-12 manufactured by Mikuni Shikiso; solid concentration: 25% by mass) was added to 100 g of the aqueous resin dispersion. Then 0.1 g of Aquanate 130 (polyisocyanate) manufactured by Nippon Polyurethane was added thereto followed by stirring. The resulting aqueous dispersion of the resin mixture was applied onto one side of the above woven fabric by means of a knife coating method and the resin amount after drying was made 1.9 g/m$^2$. Characteristic of this coated fabric was evaluated and the result is shown in Table 1.

Example 3

Polyamide 66 yarn comprising 144 filaments and having the total fineness of 470 dtex was woven by plain weave is a water jet loom, then subjected to a shrinkage processing using boiling water and subjected to a dry finishing at 110° C. to give a woven fabric having the warp density of 48 yarn numbers/2.54 cm and the weft density of 48 yarn numbers/2.54 cm. An antioxidant (Irganox 1330 manufactured by CIBA Japan) in an amount of 0.4% by mass in terms of a polymer ratio and a thermoplastic polymer (Mw: 130,000) being polymerized to make the ratio by mole among polyamide 6, an adduct of polyethylene glycol to propylamine (number-average molecular weigh: 600) and adipic acid 2.9:1:1 were used to prepare an aqueous resin dispersion (pH 6.8) having solid concentration of 10% by mass. After that, 0.02 g of each of the pigments used in Examples 1 and 2 was added to 100 g of the aqueous dispersion. Then 0.1 g of Aquanate 210 manufactured by Nippon Polyurethane was added to the aqueous resin dispersion followed by stirring. The resulting aqueous dispersion of the resin mixture was applied onto one side of the above woven fabric by means of a knife coating method and the resin amount after drying was made 8.1 g/m$^2$. Characteristic of this coated fabric was evaluated and the result is shown in Table 1.

Comparative Example 1

The same operation as in Example 1 was conducted except that 3 g of carboxymethyl cellulose (7A manufactured by Daiichi Kogyo Seiyaku) was added in place of polyisocyanate. Amount of the resin after drying was 5.0 g/m$^2$.

Comparative Example 2

The same operation as in Example 1 was conducted except that the adding amount of polyisocyanate was changed to 12 g. Since the mixed solution was foamed within 2 hours, no coating was carried out.

Comparative Example 3

The same operation as in Example 1 was conducted except that no polyisocyanate was added. Amount of the resin after drying was 5.2 g/m$^2$.

Comparative Example 4

The same operation as in Comparative Example 3 was conducted except that an aqueous silicone emulsion (thermoset) was used in place of an aqueous polyamide dispersion. Amount of the resin after drying was 8.5 g/m$^2$.

TABLE 1

|  | Unit | Example 1 | Example 2 | Example 3 | Comparative Example 1 | Comparative Example 2 | Comparative Example 3 | Comparative Example 4 |
|---|---|---|---|---|---|---|---|---|
| Fineness | dtex | 400 | 350 | 470 | 400 | 400 | 400 | 400 |
| Filament number | number | 108 | 144 | 144 | 108 | 108 | 108 | 108 |
| Weaving density (warp/weft) | yarn numbers/inch | 58/56 | 58/57 | 48/48 | 58/56 | 58/56 | 58/56 | 58/56 |
| Cover factor |  | 2163 | 2041 | 1974 | 2163 | 2163 | 2163 | 2163 |
| Concentration of aqueous dispersion of resin | (%) | 25 | 5 | 10 | 25 | 25 | 25 | 25 |

TABLE 1-continued

| | Unit | Example 1 | Example 2 | Example 3 | Comparative Example 1 | Comparative Example 2 | Comparative Example 3 | Comparative Example 4 |
|---|---|---|---|---|---|---|---|---|
| Pigment type | | DY-4 | DY-12 | DY-4/DY-12 | DY-4 | DY-4 | DY-4 | DY-4 |
| Adding amount of pigment liquid | g | 0.4 | 1.2 | 0.02/0.02 | 0.4 | 0.4 | 0.4 | 0.4 |
| Amount of the pigment calculated as a solid | g | 0.1 | 0.3 | 0.01 | 0.1 | 0.1 | 0.1 | 0.1 |
| Reactive compound | | AQ-210 | AQ-130 | AQ-210 | — | AQ-210 | — | — |
| Concentration of reactive compound | (%) | 100 | 100 | 100 | — | 100 | — | — |
| Number-average functional group number | | 3.2 | 4.5 | 3.2 | — | 3.2 | — | — |
| Adding amount of reactive compound | g | 2.5 | 0.1 | 0.1 | — | 12 | — | — |
| Applied amount of resin | g/m² | 4.1 | 1.9 | 8.1 | 5 | — | 5.2 | 8.5 |
| Air permeability (100 kpa) | L/cm²/min | 0.005 | 0.58 | 0.28 | 0.04 | — | 0.008 | 0.63 |
| Color change rate | (%) | 0.6 | 9.3 | 6 | 12 | — | 11 | 0.8 |
| Flammability (warp/weft) | mm/min | Self-extinguishable | Self-extinguishable | Self-extinguishable | Self-extinguishable | — | Self-extinguishable | 85/92 |

Example 1 was favorable as a base fabric for an air bag. In Example 2, cover factor was a bit low and concentration of the water-dispersed resin liquid was low whereby the resin dispersion was impregnated into a base fabric and the amount of the resin existing on surface of the base fabric was small as compared with Example 1. As a result, air permeability was a bit high and the color change rate was also a bit high. In Example 3, since the rate of the reactive compound was a bit small, color change rate was slightly high. On the other hand, in Comparative Example 1, although the property such as air permeability was good, the color change rate when water drops were applied was big since only a thickener was added and no reactive compound was added. In Comparative Example 3, since no reactive compound was added as well, the color change rate when water drops were applied was big. In Comparative Example 4, flammability was bad because of the use of a silicone emulsion.

INDUSTRIAL APPLICABILITY

In the base fabric for an air bag according to the present invention, color change to water is small in spite of the use of a water-dispersible resin and flammability is excellent even by small applying amount of the resin whereby its operating ability during the manufacture is good and, due to the small resin amount, it is possible to produce at low cost.

The invention claimed is:

1. A method for manufacturing a base fabric for an air bag, comprising:
   applying an aqueous resin composition containing a pigment, a reactive compound and a water-dispersible thermoplastic resin to a woven/knitted fabric made of synthetic fiber to form a coated fabric, and
   subjecting the coated fabric to a thermal treatment,
   wherein the water-dispersible thermoplastic resin comprises a polyamide, the pigment is dispersed in water using a surfactant, the surfactant contains a hydroxyl group, and the number-average functional group number of the reactive group in the reactive compound is 2 or more.

2. The method for manufacturing a base fabric for an air bag according to claim 1, wherein the reactive compound is capable of reacting with the surfactant.

3. The method for manufacturing a base fabric for an air bag according to claim 1, wherein the reactive compound has a reactive group which reacts with the hydroxyl group in the surfactant.

4. The method for manufacturing a base fabric for an air bag according to claim 1, wherein the surfactant is a nonionic surfactant.

5. The method of claim 1, wherein the reactive compound is a polyisocyanate.

6. A base fabric for an air bag, comprising:
   a resin composition containing a pigment and a thermoplastic resin applied to a woven/knitted fabric made of synthetic fiber in an amount of 0.1 to 8.0 g/m², the thermoplastic resin comprising a polyamide,
   wherein color change rate before and after application of water drops calculated by the following formula (I) is 10% or less:

Color change rate=$(|L^*$ value after the application$-L^*$ value before the application$|^2+|a^*$ value after the application$-a^*$ value before the application$|^2+|b^*$ value after the application$-b^*$ value before the application$|^2)^{1/2}/[(L^*$ value before the application$)^2+(a^*$ value before the application$)^2+(b^*$ value before the application$)^2]^{1/2} \times 100$     Formula (1).

7. The base fabric for an air bag according to claim 6, wherein the burning rate by a flammability test measured by JIS D 1201 (Horizontal method) is 80 mm/min or less.

* * * * *